(No Model.)
W. E. BROOKE.
SAW TOOTH.
No. 470,977. Patented Mar. 15, 1892.
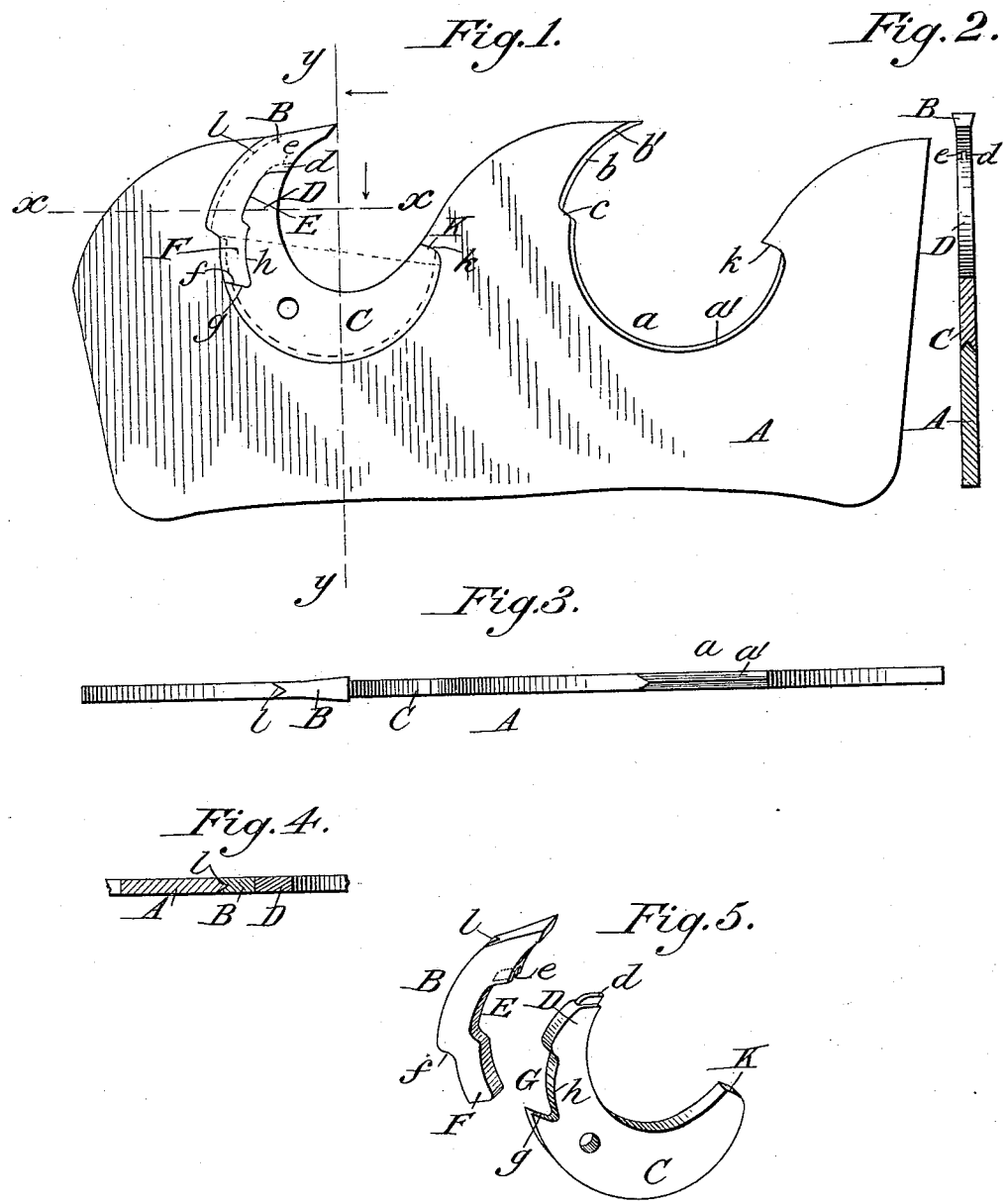
Attest:
F. H. Schott
Wm C. Boyden
Inventor
William E. Brooke
per Fred C. Tasker.
his Atty.
THE NORRIS PETERS CO., PHOTO-LITHO., WASHINGTON, D. C.

UNITED STATES PATENT OFFICE.

WILLIAM E. BROOKE, OF TRENTON, NEW JERSEY, ASSIGNOR TO THE AMERICAN SAW COMPANY, OF SAME PLACE.

SAW-TOOTH.

SPECIFICATION forming part of Letters Patent No. 470,977, dated March 15, 1892.

Application filed September 12, 1891. Serial No. 405,484. (No model.)

*To all whom it may concern:*

Be it known that I, WILLIAM E. BROOKE, a citizen of the United States, residing at Trenton, in the county of Mercer and State of New Jersey, have invented certain new and useful Improvements in Saw-Teeth; and I do hereby declare the following to be a full, clear, and exact description of the invention, such as will enable others skilled in the art to which it appertains to make and use the same.

This invention has reference to an improvement in detachable or insertable saw-teeth, the object thereof being to perfect and simplify the construction of saw-teeth of this character, so that the saw plate or blade provided therewith may operate with greater efficacy and value; and it therefore consists in the construction, arrangement, and combination of the several parts, substantially as will be hereinafter described and claimed.

In the annexed drawings, illustrating my invention, Figure 1 is a side view of a section of a saw, showing one tooth inserted in its recess, while another recess is left vacant to show the outline and form thereof more distinctly. Fig. 2 is a vertical section on the line $y\,y$ of Fig. 1. Fig. 3 is an edge view of the saw as represented in Fig. 1. Fig. 4 is a horizontal cross-section on the line $x\,x$ of Fig. 1. Fig. 5 is an enlarged detail perspective view representing a saw-tooth and its locking-plate independently of each other.

Similar letters of reference designate corresponding parts throughout all the different figures of the drawings.

A represents a portion of a saw plate or blade, B one of the insertible teeth, and C the locking-plate or part which co-operates with the tooth to secure the latter in a fixed position in the edge of the plate.

The edge or periphery of the saw-plate A is provided with a series of recesses corresponding in general outline with the continuous edges of the teeth and locking-plates that are located therein. These recesses are not each cut on circular or curved lines running from end to end of the recess, as are the recesses in my former patent, No. 446,810, dated February 17, 1891, but these recesses are cut on unequal segments of different circles, so that locking-plate and tooth may secure a firm hold and position therein.

$a$ denotes the lower or inner edge of the tooth-receiving recess, and it is cut of a suitable length on an arc of a suitable number of degrees—a semicircle or arc of one hundred and eighty degrees or less—and $b$ denotes the upper portion of the edge of the tooth-receiving recess, it being cut on an arc of a different circle from but concentric with that on which the arc of the inner edge $a$ is cut. Thus the portions $a$ and $b$ of the edge of the recess form unequal segments of different circles. Between the edge portion $a$ and $b$ is a flat angular shoulder $c$, which connects them. At the opposite end of the edge $a$ from where the shoulder $c$ is placed there is another angular shoulder $k$, against which the heel of the locking-plate abuts after the latter has been fixed in position in the recess. The edge $a$ is provided, as usual, with a tongue $a'$, and the edge $b$ with a tongue $b'$.

The tooth B is expanded or swaged at its point in the usual manner, so that it will cut a kerf of sufficient width to clear the saw-plate, thus obviating friction and consequent heating of the plate. The back edge of the tooth is provided with the triangular or V shaped groove $l$, which corresponds in shape with the tongue $b'$ on the edge $b$ of the recess, over which tongue this groove $l$ is designed to fit. The rear edge of the tooth is also convexly curved. Furthermore, it is preferably provided at a point, say, two-thirds of the distance between top and bottom with a shoulder $f$, which forms a flat face that is adapted to be seated upon the shoulder $c$, formed in the edge of the recess. The lower end of the tooth B has a foot or projection F, designed to enter a recess in the locking-plate, and on the front edge of the tooth is a recess E, having, preferably, for the most part a plain surface, but which near its upper end is provided with a small groove $e$, preferably of a right-angled form, said groove $e$ being designed to receive a lug on the locking-plate.

The locking-plate C has a general curved or semi-lunar outline, its upper edge being curved so as to form a continuous throat in connection with the outer concave edge of the tooth, and said locking-plate being provided on its lower edge with a triangular groove, which fits over the tongue $a'$ on the edge $a$ of the recess, while the lower edge K of the locking-plate is abrupt or blunt to provide a heel, which may seat itself firmly against the angular projection $k$ in the saw-plate, which projection, as is clearly seen by reference to Fig. 1, lies substantially at a right angle to the edge $a$. The upper end of the locking-plate C has a projection D, which is adapted to enter the recess E on the front edge of the tooth, and upon the upper or top end of the projection D is a lug $d$, which enters the notch or groove $e$ in the tooth, the lug $d$ being properly shaped to closely and easily fit into the said groove. Furthermore, the rear side of the locking-plate C is provided with a recess G, having sides $g$ and $h$, said recess being adapted to receive therein the foot of the tooth B, which foot lies within the recess more or less loosely, as the case may be. It will thus be seen that I provide a removable saw-tooth having numerous advantages and by the use of which a strong, firm, and durable combination is furnished. A saw of this character will stand a large amount of feed. The recess being cut on segments of different circles having different diameters and being provided with the two stops or shoulders $c$ and $k$, which lie at diametrically-opposite ends of the inner or lower segment $a$ of the recess, permits the tooth and locking-plate to be inserted and held therein in a strong, firm, and efficient manner, and it will be found in actual practice that many advantages will accrue from the rigidity and firmness of this combination. It will be noted that the arcs $a$ and $b$ may vary considerably in size without departing from my invention, such variation being either relative or absolute.

Having thus described my invention, what I claim as new, and desire to secure by Letters Patent, is—

1. The combination, with a saw-plate having a recess whose edge is formed by two unequal arcs or segments, the inner of which is substantially a semicircle and the outer of which is the arc of a circle concentric with that to which the inner arc belongs, there being between the two unequal segments an angular stop or shoulder and there being also a diametrically-opposite stop or shoulder at the other end of the inner arc, of a saw-tooth having its rear edge engaging that portion of the edge of the recess formed on the outer arc, having also a shoulder seated upon the aforesaid intervening stop and likewise a depending foot engaging a part of the inner arc of the recess, and a locking-plate engaging the remainder of the inner arc of said recess, with a heel engaging the other stop and provided with a projection which enters a recess in the front edge of the tooth and having a recess below it for receiving the foot of the tooth, the outer or upper edge of the locking-plate being curved so as to form a continuous concave throat in connection with the outer concave edge of the tooth, substantially as described.

2. The combination, with the saw-plate A, having a recess with edges $a$ and $b$ cut on arcs of different circles and provided with tongues $a'$ and $b'$, respectively, the inner arc $a$ being substantially a semicircle and the outer arc $b$ being a part of a circle concentric with that to which the arc $a$ belongs, there being between the two segments a flat angular connecting-shoulder $c$ and at the opposite end of the edge $a$ another angular shoulder $k$, the tooth B, having a rear groove $l$, which receives the tongue $b'$, a shoulder $f$, which sits upon the shoulder $c$, and a depending foot F, of a locking-plate C, having a heel K abutting against the shoulder $k$ and a projection D entering the recess E in the front edge of the tooth, with tongue $d$ entering groove $e$ on the tooth, and said locking-plate having likewise the recess G for receiving the foot F, and its front or upper edge being concave, so as to form a continuous throat in conjunction with the concave edge of the tooth, substantially as described.

3. The combination, with a saw-plate having a recess whose edge is formed by two unequal arcs or segments, the inner of which is substantially a semicircle and the outer of which is the arc of a circle concentric with that to which the inner arc belongs, there being between the two unequal segments an angular stop or shoulder, of a saw-tooth having its rear edge engaging that portion of the edge of the recess formed on the outer arc, having also a shoulder seated upon the aforesaid intervening stop and likewise a depending foot engaging a part of the inner arc of the recess, and a locking-plate engaging the remainder of the inner arc of said recess and provided with a projection which enters a recess in the front edge of the tooth, substantially as described.

In testimony whereof I affix my signature in presence of two witnesses.

WM. E. BROOKE.

Witnesses:
H. C. WILKINSON,
PETER C. MCAULEY.